Patented Apr. 15, 1941

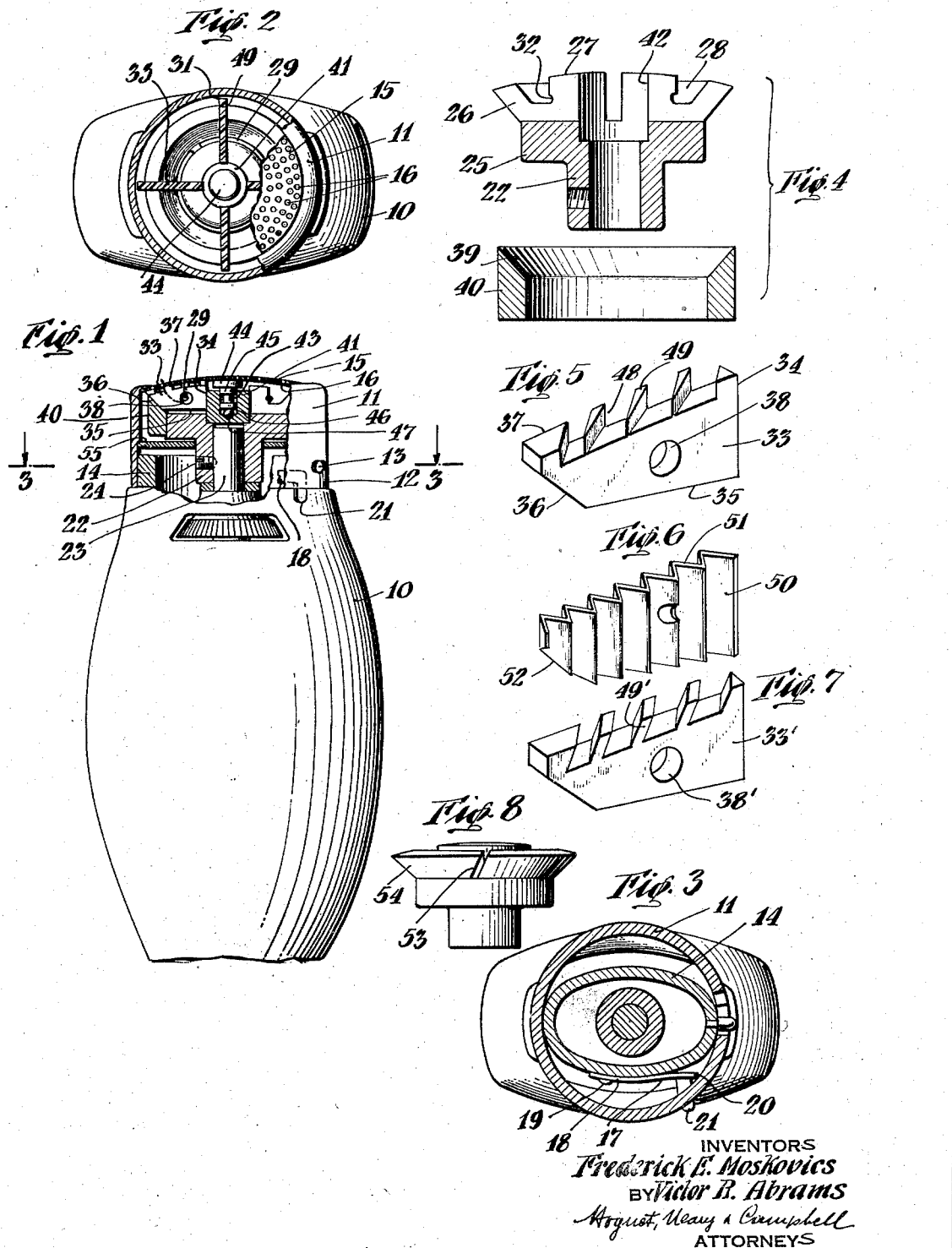

2,238,278

UNITED STATES PATENT OFFICE 2,238,278

SHAVING DEVICE

Frederick E. Moskovics, Greenwich, Conn., and Victor R. Abrams, Maplewood, N. J., assignors, by direct and mesne assignments, to Eleanor U. Andrews, Greenwich, Conn.

Application May 28, 1938, Serial No. 210,682

12 Claims. (Cl. 30—43)

This invention relates to shaving devices and particularly relates to improvements in dry shaving razors of the type disclosed in our co-pending application Serial No. 185,108, filed January 15, 1938, now Patent No. 2,119,021, granted May 31, 1938, of which this is in part a continuation.

An object of this invention is to provide a rotary type of shaving device which is operable to sever hair by a shearing action in which the shearing action takes place at different shearing angles to insure severance of the hair close to the skin.

Another object of the invention is to provide an improved type of blade for rotary shaving devices having a plurality of inclined shearing edges.

Another object of the invention is to provide a rotary type of hair clipper having a thin skin contacting shear plate which is inherently rigid and which is supported against excessive flexing when pressed against the skin.

An additional object of the invention is to provide a novel type of rotary blade support which is characterized by simplicity of construction and which as an incident to rotation thereof causes the shearing blades to be urged into engagement with a cooperating skin contacting shear plate.

A further object of the invention is to provide a novel means for attaching and supporting a shearing blade on a rotatable plate support to allow the blade to move relatively to the support without detachment therefrom.

Other objects of the invention will become apparent from the description of typical forms of shaving devices embodying the present invention.

Shaving devices made in accordance with the present invention include a domed or convex skin-contacting shear plate which is characterized by excellent rigidity even when made of extremely thin material, and a cutter member having at least one shearing blade thereon which is rotated about an axis perpendicular to the shear plate to wipe the blade across the under surface of the shear plate and sever hairs which project through the apertures in the shear plate. The shearing blade or blades are provided with a plurality of inclined teeth having shearing edges thereon which are arranged to cooperate with the edges of the apertures in the skin contacting plate to produce a shearing or draw cut. The inclined shearing edges of different blades are inclined at different angles to cause the hairs to be sheared between the blades and different portions of the edges of the apertures in the shear plate. The inclination of the shearing edges is such as to prevent the hairs from being pushed into a portion of the apertures where an ineffective shearing action might take place, for the reason that the cutting action is first in one direction and then in another direction, thereby vibrating the hairs which project through the shear plate and causing them to be projected substantially perpendicular to the skin for severance close to the skin. The thin shear plate allows the shearing action to take place very close to the surface of the skin and at the same time prevents skin burn or irritation by rotating cutting elements, because the apertures therein may be made sufficiently small to allow passage of the hairs therethrough without permitting the skin to enter into the apertures.

The domed shape of the shear plate renders it comparatively rigid even if made of very thin material, thereby preventing binding of the cutter blades with the shear plate. Supporting means spaced slightly from the under surface of the shear plate and carried by the rotary cutterhead prevents excessive flexing of the domed shear plate when it is pressed against the skin and this also aids in preventing binding or excessive friction between the shearing blades and the skin contacting plate.

For a better understanding of the present invention, reference may be had to the accompanying drawing in which:

Figure 1 is a side view of a typical form of shaving apparatus embodying the present invention, partly broken away and partly in section, to show details of the construction;

Figure 2 is an end view looking toward the head of the shaving apparatus with the shear plate partially broken away to show details of the cutter head;

Figure 3 is a view in section taken on line 3—3 of Figure 1;

Figure 4 is an enlarged sectional view of the elements forming the cutter member prior to assembly;

Figure 5 is an enlarged perspective view of one form of shearing blade;

Figure 6 is a perspective view of a modified form of shearing blade;

Figure 7 is a perspective view of another form of blade; and

Figure 8 is a side view of a portion of a modified form of supporting member for shearing blades.

The form of the invention disclosed in Figure 1 includes a handle 10 having an electric motor therein (not shown) and a tubular shell 11 which is retained by means of bayonet slots 12 and cooperating pins 13 on the upper end 14 of the handle 10. Mounted in the outer end of the tubular shell 11 is a skin contacting shear plate 15 formed of thin metal having a plurality of small apertures 16 therein which are on the order of about .025 of an inch in diameter. The plate 15 is formed in the shape of a portion of the surface of the sphere having a radius of curvature on the order of two inches. The shell 11 and shear plate 15 are retained on the end 14 of the handle by means of a friction lock 17 (shown in Figure 3) which consists of a strip 18 of spring metal attached as by means of a rivet 19 to a side of the upper end of the handle 14 and has an outwardly curved end portion 20 which engages the inner surface of the shell 11. The friction lock 17 is provided with a downwardly directed finger piece 21 which permits inward movement of the end 20 of the lock 17, thus releasing the collar 11 for rotation.

Cooperating with the skin contacting shear plate 15 is a rotary cutter head which includes a collar 22 mounted on the end of the motor shaft 23 as by means of a set screw 24. The cutter head includes an enlarged disk portion 25 adjacent its center and a substantially frusto-conical member 26 having a curved upper surface 27 which is concentric with the domed shear plate 15. An annular groove 28 is provided in the frusto-conical member 26 for receiving severed hairs and for receiving a spring or split ring 29 which retains the shearing blades 33 in diametrically extending slots 31 in the cutter head. The slots 31 may be easily formed in the cutter head by milling or sawing, and as many of the slots as desired may be formed in the head, although in the preferred form of device, two intersecting diametrical slots are provided. An undercut groove 32 is formed adjacent the bottom of the slot 28 and receives and retains the spring or split ring 29 adjacent the bottom of the slot 28. The shearing blades 33 are loosely mounted on the spring ring 29 as shown in Figure 1. The shearing blades 33 consist generally of trapezoidal shaped strips of metal having two right angularly related edges 34 and 35, an inclined edge 36 and an arcuate edge 37 of substantially the same radius of curvature as the under surface of the shear plate 15. The shear blades 33 are also provided adjacent their center portion apertures 38 with a considerably greater diameter than the cross-sectional diameter of the spring ring 29, whereby the blades can move upwardly and axially through a limited distance in the slots 31. The inclined edges 36 of the blades are adapted to cooperate with an inclined or conical surface 39 on an annular ring or sleeve 40 which is received on the disk-portion 25 of the cutter head and is fixed thereto in abutting relationship by swaging over a portion of the edge of the disk 25 as shown in Figure 1, thereby forming a substantially unitary assembly. When the cutter head 22 is rotated by the motor, the centrifugal force exerted on the cutters 33 urges them outwardly and their inclined edges 36 slide on the inclined surface 39 on the collar 40 causing the blades to be urged upwardly or toward the shear plate 15, thereby assuring close engagement between the shear plate and the shearing edges of the blade 33.

Inward movement of the blades 33 is limited by means of a cup-shaped bushing 41 which is fixed in a recess 42 in the cutter head and provides vertically extending shoulders against which the inner edges 34 of the blades may bear. In the inner recess 43 of the bushing 41, is mounted a button or disk 44 having a reduced shank 45 which fits closely within the recess 43 and which has an inner end 46 engaging a small ball bearing 47 to reduce the frictional engagement between the button 44 and the bushing 41 during rotation of the cutter. The button 44 is spaced about .001 of an inch from the inner surface of the shear plate 15, and is adapted to engage the under surface of the shear plate and prevent it from undue flexing should the shear plate be pushed too strongly against the skin.

In Figure 5 is shown one of the shear blades 33, greatly enlarged. The blade 33 is provided with a plurality of saw or milled cuts 48 which form upstanding teeth 49 of triangular cross-section thereon. The cuts 48 are made at an angle to the axis of the cutter, and as a consequence, the teeth are likewise inclined relatively to the cutter. As shown in Figure 2, the teeth 49 on successive blades 33 in the cutter head are oppositely inclined relatively to the axis of the blades 33. With this construction, when a hair projects through an aperture 16 in the shear plate 15, and a blade strikes it, a shearing action will be produced due to the relative inclination of the shearing edge of the blade 33 and the edge of the aperture 16. In some instances, the hair may be tilted sufficiently by the impact of the shearing edge to force it partially out of the aperture 15 without severing it. However, the succeeding shearing edge being inclined in an opposite direction, will catch the hair and move it against a different portion of the aperture, and will shear at a different angle, thereby tending to straighten the hair out perpendicularly to the skin and sever it closely adjacent to the skin.

A similar shearing action can be obtained with the type of blade disclosed in Figure 6. This form of blade consists of a corrugated strip of metal 50 in which the angles between converging faces of the strip 50 are on the order of 60°. The upper or shearing edge 51 of the cutter 50 is formed on an arc concentric with the under surface of the shearing plate. The blade 50 is provided with an inclined edge 52 which cooperates with the inclined surface 39 of the cutter-supporting head to cause the blade 50 to be urged outwardly and upwardly by centrifugal force during operation of the cutter head 22. This type of blade operates in a manner similar to the blade described above, in that the shearing edges provide a true shearing cut during operation.

Another form of blade is disclosed in Figure 7 which is similar to the blade disclosed in Figure 5. The modified form of blade consists of a thin strip of steel 33' having an aperture 38' therein for receiving a retaining ring. The upper edge of the strip 33' is slotted to form teeth 49' that are inclined with respect to the longitudinal and transverse axes of the strip 33'. The upper edges of the teeth 49' are ground or lapped to conform to the under surface of the shear plate, thereby forming wedge-shaped or knife-like shearing edges thereon. The teeth 49' may be triangular in cross-section or rectangular as they are shown.

As shown in Figure 8, the slots 53 in the cutter head 54 may be inclined relatively to the axis of rotation of the cutter head. The blades may be mounted in the slot 53 and ground or lapped to provide the proper alignment of shearing edges with the under surface of the shear plate 15. By mounting the blades in this way, and grinding their surfaces parallel to the surface of the head 43, wedge-shaped or knife-like cutting edges are produced which act to sever the hairs in a manner similar to a razor blade.

In order to prevent severed hair from falling out of the razor and getting on the clothing and into the bearings of the electric motor, a disk-like hair retaining member 55 may be loosely mounted beneath the disk-like portion 25 of the cutter head as shown in Figure 1. The member 55 frictionally engages the shell 11 and thereby retains the severed hair in the shell 11. The hair may be removed from the interior of the shell 11 by depressing the friction lock 17, rotating the shell 11 to release the pins 13 from the bayonet slots 12 and withdrawing the shell 11 and shear plate 15, thereby exposing the entire cutter head 32 and shearing edges.

The above described constructions constitute improvements over the types of shaving razors disclosed in our copending application Serial No. 185,108, filed January 15, 1938.

Our new construction, therefore, includes the combination of the domed perforated shear plate, and a massive rotary cutter having supporting means thereon for preventing excessive flexing of the shear plate, which are present in the dry shaving razor disclosed in our copending application Serial No. 185,108, and in addition includes improved blade constructions, a simplified cutter head and a hair receiving compartment which are not disclosed in our copending application Serial No. 185,108.

It will be understood from the foregoing that we have produced an improved construction which has a rapid and effective shearing action and which because of the increased size of the shear plate, allows much more rapid shaving to take place. It should be understood, of course, that the construction described above is illustrative only, of the present form of the invention, and that it can be varied considerably in many details without departing from the invention.

We claim:

1. In a shaving device, the combination of a thin, apertured, skin-contacting shear plate, an inner cutter member having at least one outwardly extending slot therein, a blade movably disposed in said slot, said blade having a plurality of substantially parallel shearing edges inclined at an acute angle to the axis of the blade and contacting the under surface of said shear plate, and means for rotating the cutter about an axis substantially normal to the shear plate to wipe the shearing edges over said under surface to sever hairs projecting through the apertured shear plate.

2. The shaving device set forth in claim 1 in which the slot in the cutter member is inclined to said axis.

3. In a shaving device, the combination of a thin, apertured skin-contacting shear plate, an inner cutter member having a plurality of outwardly extending slots therein, a blade movably disposed in each slot, said blades having a plurality of shearing edges inclined with respect to the axis of the blade and contacting the under surface of said shear plate, shearing edges on alternate blades being inclined oppositely, and means for rotating the cutter about an axis substantially normal to the shear plate to wipe the shearing edges over said under surface to sever the hairs projecting through the apertured shear plate.

4. In a shaving device, the combination of a thin apertured skin-contacting shear plate, a cutter member rotatable about an axis substantially normal to the shear plate and having at least one radial slot therein, a corrugated blade movably mounted in said slot and having a zig-zag shearing edge cooperating with the shear plate to sever hair, and means for rotating said cutter member.

5. The shaving device set forth in claim 4, comprising a member on the cutter member having an inclined inner surface at the outer end of the slot, and an inclined end on said blade cooperating with the inclined surface to cause the blade to be urged against the shear plate in response to rotation of the cutter.

6. In a shaving device, the combination of a thin, apertured skin-contacting shear plate, a disk-like inner cutter member having a plurality of slots and an annular groove therein, a plurality of cutter blades disposed in said slots, each having an aperture therein, a spring member of lesser cross-sectional diameter than and passing through the apertures in the blades releasably connected to the cutter member and disposed adjacent the bottom of the groove for retaining the blades in the slots with capacity for relative movement and means for rotating the cutter member about an axis substantially perpendicular to said shear plate.

7. A cutter member for a shaving device comprising a disk-like member adapted to be connected to a drive shaft, a circular member superimposed on and having a conical outer surface converging toward said disk-like member, a plurality of slots in said circular member extending inwardly from said conical surface, blades in said slots having outer edges inclined substantially complementarily to said conical surface, and an annular collar having a conical inner face connected to the circular member with their conical faces in abutment.

8. In a shaving device having a thin, apertured skin-contacting shear plate and a slotted cutter member rotatable about an axis substantially perpendicular to the skin contacting plate, the combination with the cutter member of a relatively movable blade comprising a thin strip of metal having an aperture substantially centrally thereof, means on said cutter member engageable in said aperture for limiting movement of said blade, an inclined end on said strip and a plurality of shearing edges on a longitudinal edge of said strip, said shearing edges being inclined to the axis of said strip.

9. A blade for a shaving device, comprising a corrugated strip of metal having an aperture therein, a longitudinally extending zig-zag shearing edge, and an end portion inclined at an acute angle to the shearing edge.

10. A blade for a shaving device, comprising a strip of metal having a plurality of teeth providing shearing edges spaced apart along a longitudinal edge thereof, said teeth being inclined to the longitudinal axis of the strip and an end portion inclined at an acute angle to the said longitudinal edge.

11. In a shaving device, the subcombination of a rotatable cutter member, a plurality of blades mounted on and extending outwardly from adjacent the center of the cutter member, and a plurality of shearing edges on each blade inclined at an acute angle to the axis of said blade, the shearing edges on one blade being inclined at a different angle to the axis of the blade than the shearing edges on another blade.

12. In a shaving device the combination of a thin, flexible, apertured and transversely curved skin contacting shear plate, an inner cutter member, at least one shearing element movably mounted on said cutter member and having an aperture therein, means on said cutter member disposed in said aperture for limiting movement of said shearing element and detachably connecting said shearing element to said cutter member, means for rotating the cutter member to wipe said shearing element over said shear plate to sever hairs projecting through the apertures thereof, and means on said cutter member for urging said shearing element into engagement with said shear plate.

FREDERICK E. MOSKOVICS.
VICTOR R. ABRAMS.